United States Patent [19]

Finck et al.

[11] Patent Number: 4,660,015
[45] Date of Patent: Apr. 21, 1987

[54] COIL BODY AND CONNECTIONS TO AN EXTERNAL LINE

[75] Inventors: Albin Finck, Gerbrunn; Ronald Gleixner, Ochsenfurt; Horst Hoechamer, Sugenheim; Wolfgang Pieper, Wuerzburg, all of Fed. Rep. of Germany

[73] Assignee: Siemens Aktiengesellschaft, Berlin and Munich, Fed. Rep. of Germany

[21] Appl. No.: 763,406

[22] Filed: Aug. 7, 1985

[30] Foreign Application Priority Data

Aug. 27, 1984 [DE] Fed. Rep. of Germany ....... 3431471

[51] Int. Cl.⁴ ............................................. H01F 15/10
[52] U.S. Cl. ..................... 336/192; 310/71; 310/708; 336/90; 336/198
[58] Field of Search ................... 336/90, 92, 192, 199, 336/208; 310/71, 194, 198, 208

[56] References Cited

U.S. PATENT DOCUMENTS

| | | | |
|---|---|---|---|
| 3,359,520 | 12/1967 | Foerster | 336/192 |
| 3,453,575 | 7/1969 | Davis | 336/192 |
| 4,424,505 | 1/1984 | Yatsushino et al. | 336/208 X |
| 4,546,340 | 10/1985 | Kuchunip | 336/208 X |

*Primary Examiner*—Thomas J. Kozma
*Attorney, Agent, or Firm*—Volker R. Ulbrich

[57] ABSTRACT

A coil body is provided for a small synchronous motor with a stator housing surrounding the wound coil body. The winding ends and the connector ends are soldered to the connector pins which are fastened to the one frontal flange of the coil body with a radially overhanging connecting end. The overhanging connecting end with the soldered-on winding and connecting line ends are bent inwards towards the other frontal flange and are overlapped by a swivel cover with slot openings hinge-mounted on the other facing frontal flange in which the connector pins can be held in place to relieve the strain and insulate them from the surrounding stator housing.

4 Claims, 5 Drawing Figures

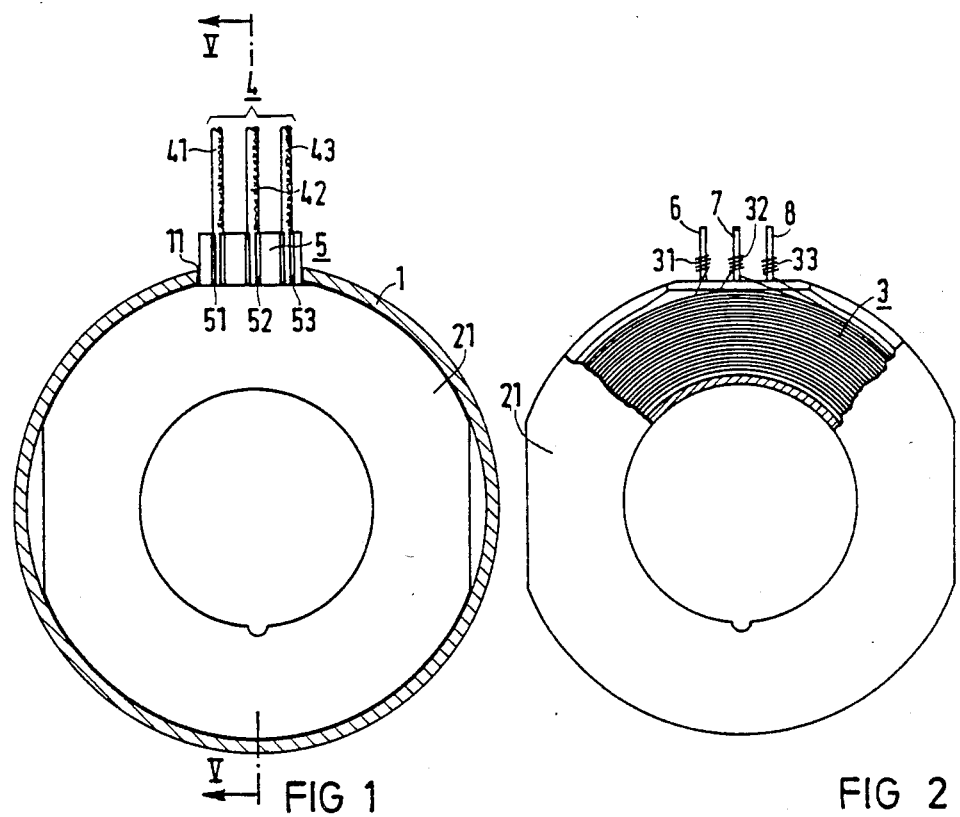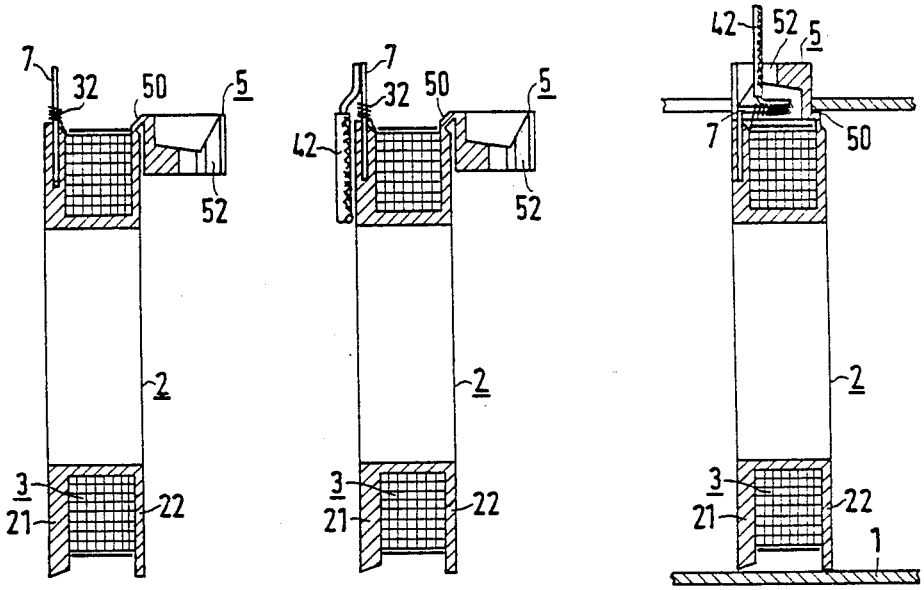

COIL BODY AND CONNECTIONS TO AN EXTERNAL LINE

BACKGROUND OF THE INVENTION

This invention relates to a coil body and method for winding and connecting to an external line.

As shown in German Auslegeschrift No. 2,758,700, a snap bow with an axial section cut has been moulded onto the radial external edge of a plastic coil core frontal flange to insulate and counteract the strain on the conductor ends of the exciter coil (also see U.S. Pat. No. 4,105,985). When fabricating the coil body, the conductor ends of the winding are pressed axially into the longitudinal slot sequentially after the coil is wound, and the snap bow with the inserted conductor ends is placed around the open side of the exciter coil and then locked in place at the outer edge of the other frontal flange. A stator housing of a small synchronous motor with an open-edge longitudinal cutout is then installed atop the thus completed coil body. The snap bow is designed so that with a portion of its web which radially overhangs the outer edges of the frontal flanges it can mesh into the longitudinal cutout of the stator housing, thereby forming an insulated and strain-relieved passageway for the conductor ends passing through the longitudinal slot.

To establish an electrical connection between the winding ends of a winding wound onto a coil body and the conductor ends of an external connecting line, connecting pins can be braced at one of the two frontal flanges of the coil body with their connecting ends projecting radially above the outer edge of the frontal flange. The insulated ends of the conductor ends fitted with plugs can be plugged onto the connecting pins. Thereafter the connecting pins with the plugged-in conductor ends can be bent sideways so that the connecting points between the frontal flanges are positioned at an adequately assured insulating distance from the superimposed metal stator housing. The frontal flanges are extended for that purpose radially beyond the area required by the inserted winding. Accordingly, it will be appreciated that it would be highly desirable to simplify the contact between the winding ends of the winding wound on the coil body and the conductor ends of the external connecting line.

It is an object of the present invention to simplify the contact between the winding ends of the winding wound on the coil body and the conductor ends of the external connecting line.

Another object is to simplify the contact for use with computer-controlled fabrication and installation techniques.

Another object is to simplify the contact without increasing the volumetric space for the required installation area of the completed coil body with the insulated exterior connecting line which can be executed in a strain-relieved fashion.

SUMMARY OF THE INVENTION

Briefly stated, in accordance with one aspect of the invention, a coil body for a small synchronous motor with a stator housing enclosing the wound coil body has a winding inserted between two frontal flanges and has insulated and strain-relieved connections for external connecting lines passing through slotted openings of an insulating piece fastened radially outside to the frontal flanges. The winding ends of the external conducting line are connected to connecting pins which radially overhang the frontal flanges of the coil body and are braced by the coil body and penetrate into the slotted openings of the insulating piece.

In another aspect of the invention, a method is presented for winding and connecting a coil body. The method includes winding a winding onto the coil body covering the connector pins with the winding ends or interim connections during the winding process. The method also includes fluxing and soldering the winding end to the connector pins, placing the insulated and tinned ends of the conductor ends in parallel to the connecting pins, and soldering the insulated ends of the conductor ends to the connecting pins. The method further includes bending the connector pins over the winding body towards the opposite frontal flange, and flipping the swivel cover over the connector pins while simultaneously clamping and thereby strain-relieving the conductor ends, particularly above their insulated terminals, in the slotted openings in the swivel cover.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 1 is a diagrammatic plan view of the frontal side of a completed coil body form fitted with the connecting pins;

FIG. 2 is a diagrammatic view similar to FIG. 1 with a winding inserted and connected to the connector pins, but without a connected external connecting line;

FIG. 3 is a sectional view of a coil body with a winding fully wound and connected to the connecting pins;

FIG. 4 is a cross-section of a coil body with the winding ends of the winding and conductor ends of the external connecting line connected to the connecting pins; and FIG. 5 is a sectional view of the completed coil body taken along line V—V of FIG. 1.

DESCRIPTION OF A PREFERRED EMBODIMENT

Referring to the drawings, a plastic, annular, single-piece, spray-cast coil body 2 with its two encompassing frontal flanges 21, 22 axially defines a winding compartment in which a winding, such as an exciter winding for a small synchronous motor, is wound. Connector pins 6, 7, 8 are injected into one frontal flange 21. In accordance with FIGS. 1–4, one free connecting end of the connector pins overhang the outer edge of frontal flange 21 radially by a certain distance.

As may be seen from FIG. 2, when winding coil 3 the connector pins 6, 7, 8, are surrounded by windings ends 31, 32, 33 of winding 3. In this specific case, the end of the one and the start of the other winding is wound continuously without interruption at connecting pin 7. The connector pins 6, 7, 8 are easily accessible for a winding robot because of their advantageous arrangement when winding coil 3.

For advantageous robot-controlled contacting of conductor ends 41, 42, 43 of the external connecting line 4, the insulated end of a conductor end is shaped, formed or curved, from inside radial to outside radial and also runs or extends from outside axial connection to the connecting pin and connects to said pin in a fashion similar to the wound winding ends of winding 3 by soldering or spot-welding (FIG. 4). As shown in FIG. 4, the conductor end 42 is generally, vertically oriented but with the two curvers, one bending the conductor end to the right and the other bending it to the left, creating a generally horizontally oriented position. This offsets one portion of the conductor from the other portion for easy connection to the connector pin. The connector pins braced by the one frontal flange 21, which contacts in this way with the winding and conductor ends, are bent at their free connecting ends to the other frontal flange 22 in such a fashion that the free connecting ends are positioned radially outside the winding compartment of the coil body defined by the radial outer edges of the frontal flanges 21, 22 (FIG. 5).

A swivel cover 5 is used for strain-relieved and insulated bracing or conducting of the conductor ends 41, 42, 43 through an axial slot opening 11 of the motor housing 1. The swivel cover 5 is inserted over the completed coil body at the outer edge of frontal flange 22 of coil body 2. The swivel cover is mounted on a hinge 50 and is injected in one piece. Initially, during contacting of the winding and conductor ends to the connecting pins, the swivel cover can be swivelled to the right away from the winding compartment. After the connection of the winding and conductor ends to the connector pins and their bending, the swivel cover can be swivelled back over the winding compartment and fastened in place to the opposite frontal flange onto which connecting pins 6, 7, 8 are mounted. The swivel cover 5 has slot openings 51, 52, 53 with an internal clearance such that when swivelling the swivel cover 5 over conductor ends 41, 42, 43, particularly in the area above their insulated terminals, the lines are clamped in place to relieve the strain on them.

It is self-evident that the length of the free connector ends of connector pins 6, 7, 8 or the degree of the bending angle of the free ends or the radial height of the slot openings 51, 52, 53 defined by the limiting side walls are to be selected so that an adequate insulating space for the connector pins and the connected insulated winding or conductor ends is assured on all sides towards the outside and a strain-relieved clamping of the conductor ends, particularly above their insulated end, is similarly assured.

An advantageous method for winding and connecting the coil body in accordance with this invention includes winding the winding onto the coil body and covering the connector pins with the winding ends or interim connections during the winding process. If necessary, an external banding is placed around the winding body between the frontal flanges. After fluxing, the winding end is soldered to the connector pins. Next parallel placement of the insulated and tinned ends of the conductor ends to the connecting pins is achieved prior to soldering the insulated ends of the conductor ends to the connecting pins. The connector pins are bent over the winding body towards the opposite frontal flange. The swivel cover is flipped over the connector pins while simultaneously clamping and thereby strain-relieving the conductor ends, particularly above their insulated terminals in the slotted openings of the swivel cover.

It will now be understood that this invention has been designed to simplify the contact between the winding ends of the winding wound on the coil body and the conductor ends of the external connecting line, particularly in terms of computer-controlled fabrication and installation options, without increasing the volumetric space for the required installation area of the completed coil body with the insulated exterior connecting line which can be executed in a strain-relieved fashion. This is achieved by having a coil body of the above-specified type designed in accordance with the innovative principle herein outlined wherein winding ends of the inserted winding and conductor end of the external conducting line connected to the connecting pins which radially overhang the frontal flanges of the coil body and are braced by insulating swivel cover.

In the coil body, the connecting area between the winding ends on the one hand and the conductor ends on the other hand can be placed in the area of the insulated piece for the insulated bushing of the lines through the stator housing and thus taken out of the coil body area between the frontal flanges. This permits a reduced installation area or, given constant motor dimensions, an increase in the motor rating, without having to relinquish any adequately insulated bushing and strain relief. At the same time, the design of the coil body is particularly suitable for computer control fabrication because the radially overhanging connector pins which are braced along the frontal flange are open and easily accessible. They are easily accessible for a winding robot installing the winding or connecting the winding ends as well as for attaching the conductor ends of the exterior connecting line. They are accessible because the connector pins with their attached conductor or winding ends are insulated by simple superimposition of the insulating piece and can be held in place to relieve strain by clamping them into the slot openings.

A further simplification in terms of the required components and installation steps is made possible by having the connector pins shaped onto the one frontal flange and by having the insulating piece as the swivelling cover shaped onto the other frontal flange in an axially facing fashion. By this construction, the swivelling cover initially opens the winding area of the coil body by swivelling outwards and, after the winding has been inserted and the winding and conductor ends connected to the connecting pins, swivels over the pins to then be held in place in this position, specifically by a catch lock at the facing frontal flange. For simple contact between the winding ends or conductor ends on the one hand and the connecting pins on the other, one embodiment of the invention has been designed so that first the windings ends are wound around and, if need be, soldered to the connecting pins, while the conductor ends with their insulated ends are routed to the connecting pins from their axial exterior position to run parallel in a radial direction and connected to the connecting pins by fluxing, soldering, or spotwelding.

The invention can be designed so that the projecting connector pins which, until contact with the winding and conductor ends are positioned radially over the bracing frontal flange, are bent towards the other frontal flange after contact and before inserting the insulating piece in such a fashion that the entire radial installation area is reduced. An insulating space on all sides is assured by means of the walls of the slot openings of the insulating piece as well as a strain-relieved clamping of the conductor ends, preferably still with their non-insulated terminals, in the slotted openings of the insulated piece. In this manner, there is attained a particularly good insulation on all sides and/or additional reduction of the structural height of the completed coil body to be inserted in the surrounding stator housing.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A coil body for a small synchronous motor, comprising a coil winding inserted on a winding bobbin between first and second frontal flanges and having insulated and strain-relieved connections to external connecting lines passing through axially open slotted openings of a swivel cover of one-piece construction with the second flange and fastened radially outside to the first frontal flange; coil winding ends of the inserted winding and conductor ends of the external connecting lines each connected to connecting pins which are located in the first frontal flange and which radially overhang the frontal flanges; said coil body formed by connecting the conductor ends, which have their insulated ends radially pointed to the outside parallel to the connecting pins which radially extend from the first frontal flange, to the connecting pins; bending the ends of the connecting pins toward the second frontal flange; folding over the swivel cover and clamping the connecting lines above the conductor ends into said axially open slotted openings of the swivel cover, said slotted openings maintaining the strain-relieved connections with the connecting lines extending radially from the cover.

2. A coil body according to claim 1, wherein the coil winding ends are coiled about the connecting pins and the conductor ends contact the corresponding connecting pin with their insulated ends parallel to the axially extending connecting pins.

3. A coil body according to claim 1, wherein the conductor ends are soldered to the connecting pins.

4. A coil body according to claim 1, wherein the conductor ends and the coil winding ends are connected to the connecting pins by pressure welding.

* * * * *